US009418139B2

(12) United States Patent
Moulinier et al.

(10) Patent No.: US 9,418,139 B2
(45) Date of Patent: Aug. 16, 2016

(54) SYSTEMS, METHODS, SOFTWARE, AND INTERFACES FOR MULTILINGUAL INFORMATION RETRIEVAL

(75) Inventors: Isabelle Moulinier, Eagan, MN (US); Elizabeth S. Lund, Minneapolis, MN (US)

(73) Assignee: Thomson Reuters Global Resources (CH)

( * ) Notice: Subject to any disclaimer, the term of this patent is extended or adjusted under 35 U.S.C. 154(b) by 2856 days.

(21) Appl. No.: 11/325,265

(22) Filed: Jan. 4, 2006

(65) Prior Publication Data

US 2006/0173886 A1 Aug. 3, 2006

Related U.S. Application Data

(60) Provisional application No. 60/641,669, filed on Jan. 4, 2005.

(51) Int. Cl.
*G06F 17/30* (2006.01)
(52) U.S. Cl.
CPC .... *G06F 17/30616* (2013.01); *G06F 17/30669* (2013.01); *G06F 17/30864* (2013.01)
(58) Field of Classification Search
USPC .......................................... 707/1, 2, 6, 7, 10
See application file for complete search history.

(56) References Cited

U.S. PATENT DOCUMENTS 6,076,088 A * 6/2000 Paik et al. .......................... 707/5
6,757,646 B2 * 6/2004 Marchisio .......................... 704/8
2002/0026456 A1 * 2/2002 Bradford ...................... 707/500
2002/0161570 A1 10/2002 Loofbourrow et al.
2003/0158725 A1 * 8/2003 Woods ............................. 704/10

FOREIGN PATENT DOCUMENTS

WO WO-02/27536 A1 4/2002
WO WO-2006/074324 A1 7/2006
WO WO-2006074324 C1 7/2006

OTHER PUBLICATIONS

"International Search Report for corresponding PCT Application No. PCT/US2006/000394", (Apr. 26, 2006), 4 pgs.

(Continued)

*Primary Examiner* — Albert Phillips, III
(74) *Attorney, Agent, or Firm* — Duncan Galloway Egan Greenwald, PLLC; Kevin T. Duncan

(57) ABSTRACT

The present inventors have devised one or more novel methods, systems, and interfaces for facilitating multi-lingual searches. One exemplary method entails creating multiple language-specific indices for a collection of documents, with each index including stemmed and non-stemmed versions of terms from the documents. Users submit queries that are associated with a set of one or more target languages. Query processing entails translating original and stemmed versions of each term in a query into each of the target languages, using one or more techniques that each yield a set of potentially equivalent query terms. Each set of potentially equivalent query terms is then processed against the corresponding language-specific index, using a conventional monolingual search technique, such as a Boolean or natural language query, to identify documents from the collection. The resultant documents are presented to the user in language groupings or by computed relevance.

25 Claims, 2 Drawing Sheets

(56) References Cited

OTHER PUBLICATIONS

Goldsmith, J. A, et al., "Automatic Language-Specific Stemming in Information Retrieval", *Cross-Language Information Retrieval and Evaluation: Workshop of Cross-Language Evaluation Forum*, (*CLEF 2000*), (Sep. 2000), 1-11.

Kim, T., et al., "FromTo-CLIR™: Web-Based Natural Language Interface for Cross-Language Information Retrieval", *Information Processing and Management*, 35(4), (Jul. 1999), 559-586.

Molina-Salgado, H., et al., "Thomson Legal and Regulatory at CLEF 2001: Monolingual and Bilingual Experiments", *Second Workshop of the Cross-Language Evaluation Forum on Evaluation of Cross-Language Information Retrieval Systems (CLEF 2001)*, (Sep. 2001), 226-234.

Moulinier, I., et al., "Thomson Legal and Regulatory at NTCIR-3: Japanese, Chinese and English Retrieval Experiments", *Proceedings of the Third NTCIR Workshop*, (2003),1-6.

Moulinier, I., "Thomson Legal and Regulatory at NTCIR-4: Monolingual and Pivot-Language Retrieval Experiments", *Proceedings of the Fourth NTCIR Workshop*, (Jun. 2-4, 2004), 1-8.

Moulinier, I., et al., "Thomson Legal and Regulatory Experiments for CLEF 2002", *Advances in Cross-Language Information Retrieval, Third Workshop of the Cross-Language Evaluation Forum*, (*CLEF, 2002*), (Sep. 19-20, 2002), 155-163.

Moulinier, I., et al., "West Group at CLEF2000: Non-English Monolingual Retrieval", *Workshop of the Cross-Language Evaluation Forum*, (2000),1-8.

"Australian Application Serial No. 2006203912, Office Action Mailed Jan. 9, 2009", 2 pgs.

"Chinese Application Serial No. 200680001792.8, Office Action mailed Jul. 11, 2008", 5 pgs.

"European application No. 06717573.7, Office action mailed Jul. 24, 2009", 4.

"New Zealand Application No. 555948, Examiner Report mailed on Jun. 4, 2009", 1.

\* cited by examiner

SYSTEMS, METHODS, SOFTWARE, AND INTERFACES FOR MULTILINGUAL INFORMATION RETRIEVAL

RELATED APPLICATION

The present application claims priority to U.S. Provisional Application 60/641,669 which was filed on Jan. 4, 2005, and which is incorporated herein by reference.

TECHNICAL FIELD

Various embodiments of the present invention concern information retrieval, particularly multi-lingual or cross-lingual information retrieval systems, methods, and software.

BACKGROUND

The importance of search engine technology has grown significantly in the last decade or so, mirroring the expansion and usage of the Internet. When a user clicks a search button, a search engine hunts through tens of millions of terms to find terms and corresponding documents that satisfy the query. But, this superficial simplicity obscures the complexity of the underlying search technology, because good search engines do not generally stop with a simple matching of query terms.

To appreciate the complexity, consider that search engines fall generally into one of two categories: monolingual or multilingual. Monolingual search engines receive queries or search requests in one language, and retrieve documents in the same language. For example, Spanish language queries yield Spanish language documents. Monolingual search engines typically process a query by breaking, or parsing, it into individual terms, and then reducing or "stemming" each individual term to its root or base form. The stemmed terms, sometimes in combination with equivalent terms, are then used to find relevant documents. Thus, for example, a search for documents containing the word 'cat' also retrieves documents that include the term cats, cat's, cats', or even feline.

Multilingual searches engines, on the other hand, receive search requests in one language, such as German, and retrieve relevant information in another language, such as French or English. In such cases, the challenge of effective searching is more complex, because in non-English languages, nouns can be masculine, feminine, or neutral; verbs change form to show number (singularity or plurality), to show tense (present, past, future and so forth), and to show person—first ("I"), second ("you"), and third ("he/she/it."); adjectives change form based on the nouns they modify; and character punctuation, such as accent or other diacritical marks, significantly affect meaning. While stemming resolves these complexities in a monolingual search, stemming alone cannot address the added complexities of linguistic conflicts across languages, and in some cases, may even interfere. For example, gender in most languages can be normalized to a single stem without loss of significant meaning; however, there are some languages, such as Portuguese, that require gender to be retained in order to maintain meaning. As a result, multilingual search engines typically rely on some method of translating queries and possibly documents into a common language.

Although there is continuing research in this area, the present inventors have recognized a need for alternative methods, systems, and interfaces for facilitating multi-lingual searches.

SUMMARY

To address this and/or other needs, the present inventors have devised one or more novel methods, systems, and interfaces for facilitating multi-lingual searches. For example, one exemplary method entails creating multiple language-specific indices for a collection of documents, with each index including stemmed and non-stemmed versions of terms from the documents. Each term in the index is associated with a document identifier, a position indicator, and a language indicator. The exemplary method further entails receiving a query and a set of one or more target languages from a user. The query is parsed into one or more terms or phrases, with each term or phrase associated with a specific language.

The original and stemmed versions of each term or phrase are then translated into the target languages, using one or more techniques that each separately yields a set of one or more potentially equivalent query terms. Exemplary techniques include using a database of pre-translated documents, an electronic language dictionary, an automated translator, and pivot language. Each set of potentially equivalent query terms is then taken as a separate query and processed against the corresponding language-specific index, using a conventional monolingual search technique, such as a Boolean or natural language query, to identify documents from the collection. The resultant documents are presented to the user in language groupings or by computed relevance.

DETAILED DESCRIPTION OF EXEMPLARY EMBODIMENT(S)

This description, which references and incorporates the above-identified Figures, describes one or more specific embodiments of an invention. These embodiments, offered not to limit but only to exemplify and teach the invention, are shown and described in sufficient detail to enable those skilled in the art to implement or practice the invention. Where appropriate to avoid obscuring the invention, the description may omit certain information known to those of skill in the art.

Exemplary Multilingual Information-Retrieval System

Figure 1:
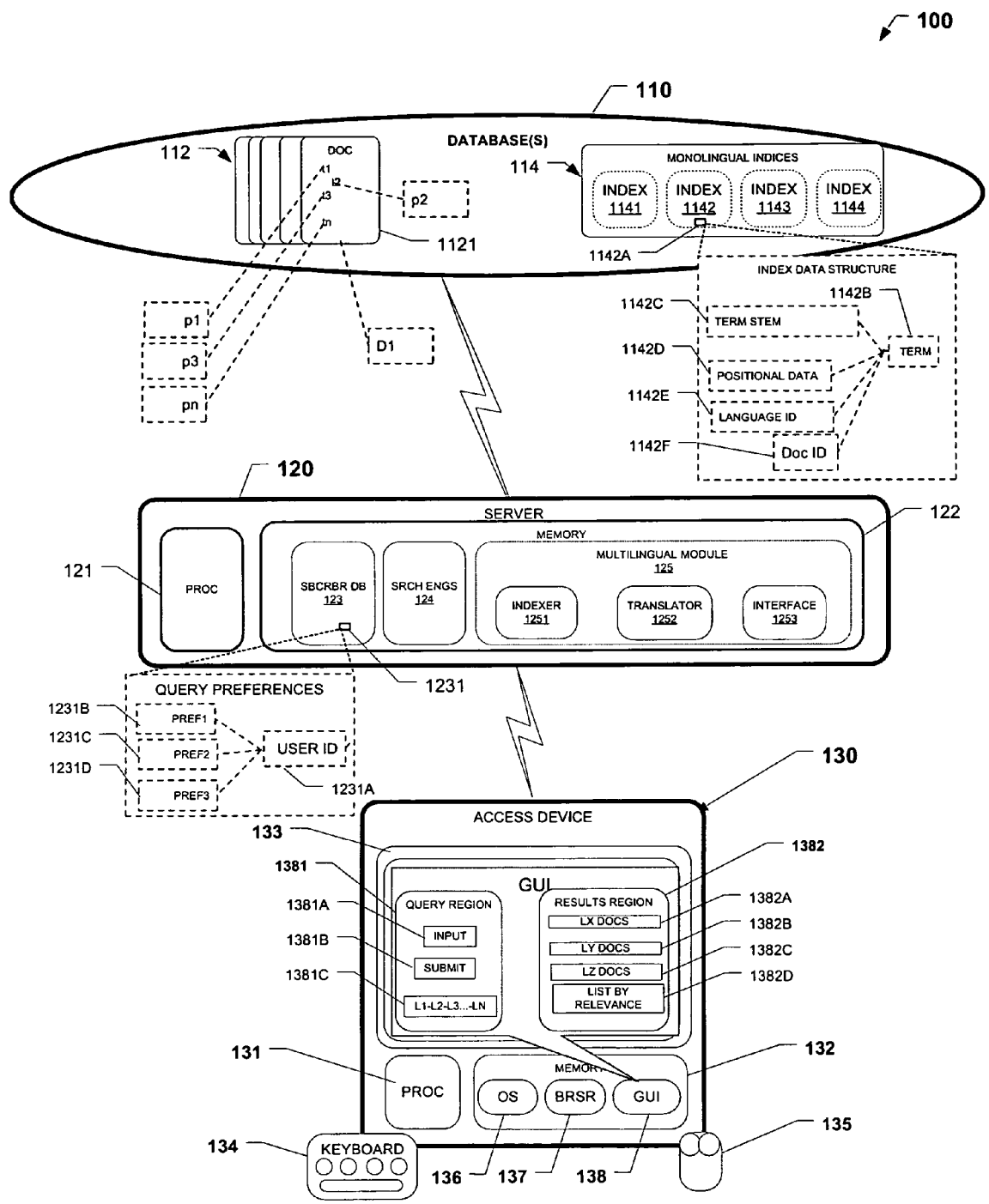
FIG. 1 is a block diagram of an exemplary multilingual information retrieval system corresponding to one or more embodiments of the present invention.

FIG. 1 shows an exemplary online multilingual information-retrieval system 100, which incorporates teachings of the present invention. System 100 includes one or more databases 110, one or more servers 120, and one or more access devices 130.

Databases 110 include a set of multilingual documents 112 and corresponding set of monolingual indices 114.

Documents 112, in the exemplary embodiment, include English, French, German, and Japanese documents. (Other embodiments may include other languages, and in some embodiments, some of the documents are multilingual, meaning that one or more portions, such as a paragraph, are written in a different language than other portions of the documents.) Each of the documents, of which document 1121 is representative, is associated with a unique document identifier, such as D1, and includes a number of terms, such as terms t1, t2, t3, . . . , tn, with each term having a corresponding position within the document, such as p1, p2, p3, . . . , pn. Multilingual documents 112 are associated logically with monolingual indices 114.

Monolingual indices 114 include an English index 1141, a French index 1142, a German index 1143, and a Japanese index 1144, each of which has a similar structure. Representative of the other indices, French index 1142 includes a number of data structures, such as representative data structure 1142A. Data structure 1142A includes a term 1142B in its original form from at least one of documents 112, a normalized or stemmed version of the term 1142C, positional data 1142D, language identifier 1142E, and document identifier 1142F. Assigning document terms to these language-specific indexes not only enables the system to discern the language type of each document term, both in its original form and its stemmed form, but also enables the system to find each term in a document, with all the searching options available in conventional monolingual searches. In some embodiments, the indices are logical portions of a single index, whereas in other embodiments, each index is logically independent of the others and may reside in separate storage locations or devices.

Databases 110, which take the exemplary form of one or more electronic, magnetic, or optical data-storage devices, include or are otherwise associated with respective indices (not shown). Each of the indices includes terms and phrases in association with corresponding document addresses, identifiers, and other conventional information. Databases 110 are coupled or couplable via a wireless or wireline communications network, such as a local-, wide-, private-, or virtual-private network, to server 120.

Server 120, which is generally representative of one or more servers for serving data in the form of webpages or other markup language forms with associated applets, ActiveX controls, remote-invocation objects, or other related software and data structures to service clients of various "thicknesses." More particularly, server 120 includes a processor module 121, a memory module 122, a subscriber database 123, a search module 124, and a multilingual module (or software) 125.

Processor module 121 includes one or more local or distributed processors, controllers, or virtual machines. In the exemplary embodiment, processor module 121 assumes any convenient or desirable form.

Memory module 122, which takes the exemplary form of one or more electronic, magnetic, or optical data-storage devices, stores subscriber database 123, search engines 124, and multilingual module 125.

Subscriber database 123 includes subscriber-related data for controlling, administering, and managing pay-as-you-go or subscription-based access of databases 110. In the exemplary embodiment, subscriber database 123 includes one or more preference data structures, of which data structure 1231 is representative. Data structure 1231 includes a customer or user identifier portion 1231A, which is logically associated with one or more search preferences, such as preferences 1231B, 1231C, and 1231D. Preference 1231B and 1231C include respective default value governing whether search results include documents from first and second languages, such as German and Japanese. Preference 1231D includes a default value governing whether search results are presented based strictly on relevance, or whether they are grouped via language. (In the absence of a temporary user override, for example, an override during a particular query or session, the default value for the search preferences governs.)

Search module 124 includes one or more search engines and related user-interface components, for receiving and processing queries against one or more of databases 110, with use of indices 114. In the exemplary embodiment, one or more search engines associated with search module 124 provide Boolean, tf-idf (term frequency-inverse document frequency), and/or natural-language search capabilities.

Multilingual module 125 includes an indexer module 1251, a translator module 1252, and an interface module 1253. Indexer module 1251 comprises machine readable and/or executable instructions for processing documents 112 and defining or updating indices 114. Translator module 1252 comprises machine-readable and/or executable instructions for translating and/or extending query terms (or concepts) submitted in a user query to multiple sets of equivalent query terms in one or more corresponding target languages. Interface module 1253 comprises machine readable and/or executable instructions for wholly or partly defining web-based user interfaces (such as a user interface 138) over a wireless or wireline communications network on one or more accesses devices, such as access device 130.

Access device 130 is generally representative of one or more access devices. In the exemplary embodiment, access device 130 takes the form of a personal computer, workstation, personal digital assistant, mobile telephone, or any other device capable of providing an effective user interface with a server or database. Specifically, access device 130 includes a processor module 131, a memory 132, a display 133, a keyboard 134, and a graphical pointer or selector 135 (also known as a mouse).

Processor module 131 includes one or more processors, processing circuits, or controllers. In the exemplary embodiment, processor module 131 takes any convenient or desirable form. Coupled to processor module 131 is memory 132.

Memory 132 stores code (machine-readable or executable instructions) for an operating system 136, a browser 137, and a graphical user interface (GUI)138. In the exemplary embodiment, operating system 136 takes the form of a version of the Microsoft Windows operating system, and browser 137 takes the form of a version of Microsoft Internet Explorer. Operating system 136 and browser 137 not only receive inputs from keyboard 134 and selector 135, but also support rendering of GUI 138 on display 133. Upon rendering, GUI 138 presents data in association with one or more interactive control features (or user-interface elements). (The exemplary embodiment defines one or more portions of interface 138 using applets or other programmatic objects or structures from server 120.)

More specifically, graphical user interface 138 defines or provides one or more display regions, such as a query or search region 1381 and a search-results region 1382. Query region 1381 is defined in memory and upon rendering includes one or more interactive control features (elements or widgets), such as a query input region 1381A, a query submission button 1381B, and a language selection region 1381C. Query input region 1381A also allows a user to designate or identify the language of one or more of the terms input in the query region. Language-selection region 1381C allows a user to select, using check boxes, radio buttons, or pull-down menus, one or more languages in which to search.

Search-results region 1382 is also defined in memory and upon rendering includes one or more interactive control features 1382A-1382D. Control features 1382A-1382C correspond to one or more monolingual document lists and enable a user to selectively access or retrieve one or more corresponding documents relevant to the governing query from databases 110 via server 120. Each of control features 1382A-1382C includes a respective document identifier or label, such as LX DOCS, LY DOCS, and LZ DOCS, identifying respective languages and/or the number of corresponding documents. In some embodiments, the control feature is incorporated with a folder icon or associated with a particular language tab. Control feature 1382D enables a user to selectively change the contents of results region 1382 to a relevance mode, where the documents found to be relevant to the governing query are listed in rank order of relevance.

In the exemplary embodiment, each of these control features of interface 138 takes the form of a hyperlink or other browser-compatible command input. Although FIG. 1 shows query region 1381 and results region 1382 as being simultaneously displayed, some embodiments present them at separate times.

Exemplary Methods of Operating a Multilingual Information-Retrieval System

Figure 2:
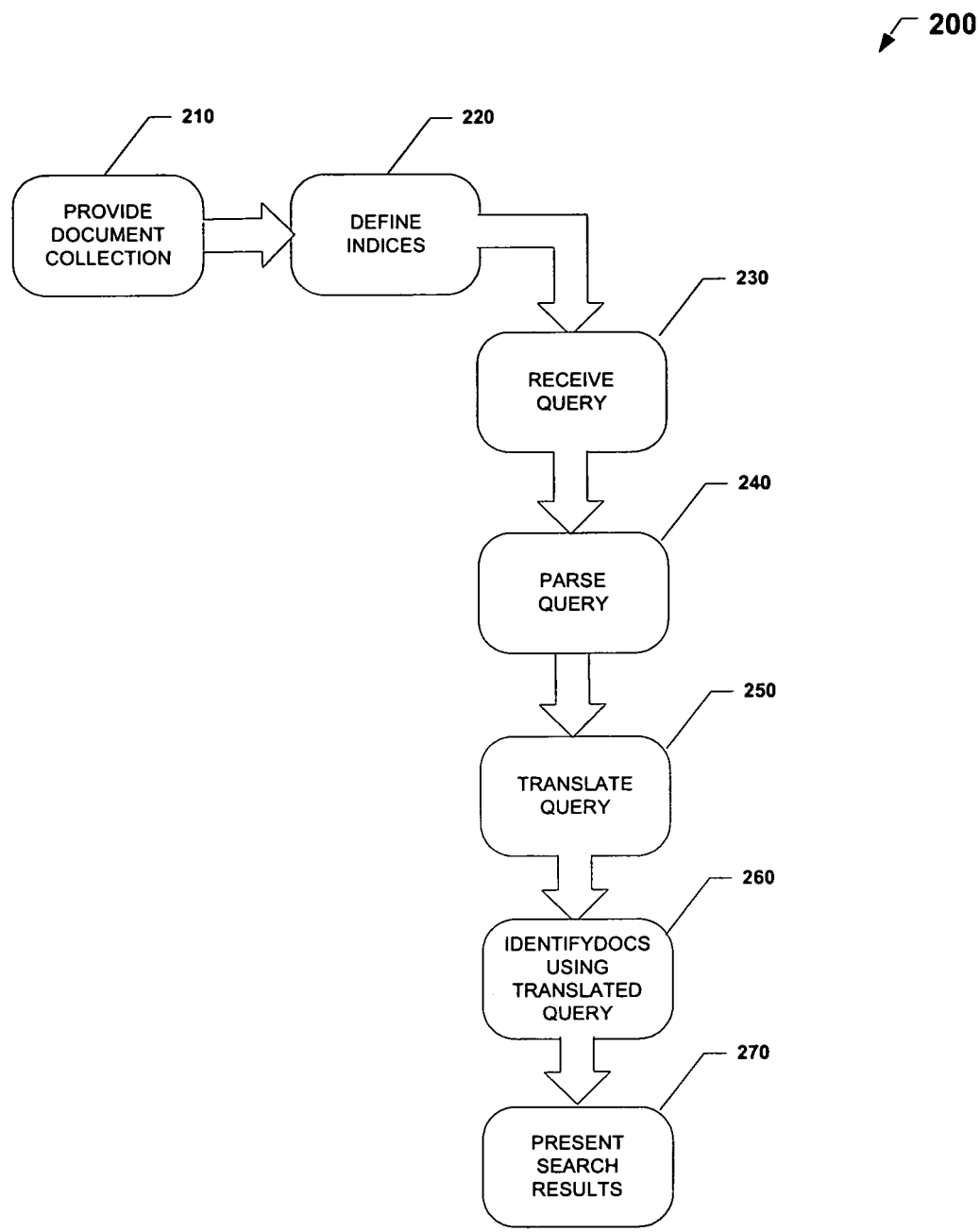
FIG. 2 is a flow chart of an exemplary method of operation which corresponds to one or more embodiments of the present invention

FIG. 2 shows a flow chart 200 of an exemplary method of operating a multilingual information retrieval system, such as system 100 in FIG. 1. Flow chart 200 includes blocks 210-270, which are arranged and described serially. However, other embodiments execute two or more blocks in parallel using multiple processors or processor-like devices or a single processor organized as two or more virtual machines or sub processors. Other embodiments also alter the process sequence or provide different functional partitions or blocks to achieve analogous results. Moreover, still other embodiments implement the blocks as two or more interconnected hardware modules with related control and data signals communicated between and through the modules. Thus, the exemplary process flow applies to software, hardware, and firmware implementations.

At block 210, the exemplary method begins with provision of a multilingual document collection—that is a collection comprising two or more documents written in two or more languages. In the exemplary embodiment, the document collection takes the form of one or more databases, such as database 110 in FIG. 1, which includes English, French, German, and Japanese documents. In the exemplary embodiment, each document is treated as a single unit with a single identifier no matter how many languages it contains, and each term in the document, regardless of its language, is associated with that single document. The assignment of consecutive word positions across language boundaries within the same document provides full text searching across language types. The process of tokenizing a document, that is, finding the words in the document, is language specific, meaning that each document (or document portion) is tokenized with a tokenizer consistent with its language. The exemplary method continues at block 220.

Block 220 entails defining a set of one or more language-specific indices for the document collection, using for example indexer 1251 in FIG. 1. In the exemplary embodiment, this entails tokenizing each of the documents in the collection, eliminating stop words, and then stemming the remaining terms. Stemmed and non-stemmed versions of the remaining terms are then stored in association with one or more document identifiers for uniquely identifying the corresponding collection document that contain the terms, and with one or more positional indicators for indicating positions of the terms in the documents. Additionally, a language indicator or identifier is stored in association with the terms to facilitate language-specific searching and to effectively define logical language-specific indices including a number of data structures, such as data structure 1142A in FIG. 1. Some embodiments may simply store terms in language-specific locations or files. After the one or more indices are defined, processing continues at block 230.

Block 230 entails receiving a query from a user. In the exemplary embodiment, this entails a user directing a browser in a client access device, such as device 130 in FIG. 1, to an internet-protocol (IP) address for an online information-retrieval system, such as system 100, and then logging onto the system using appropriate credentials. Successful login results in a web-based search interface, such as interface 138 in FIG. 1 (or one or more portions thereof) being output from server 120, stored in memory 132, and displayed by client access device 130.

The user then defines the query by interacting with the interface, specifically entering terms of the query into a query input region and selecting one or more of the listed target languages for use in directing the query to appropriate databases or portions thereof; and finally actuating a query submission feature to transmit the query to a server, such as server 120 for processing. In some embodiments, the user also identifies the language of the query, or the language of one or more portions, such as words or phrases, in the query. The identification of language may be done automatically and/or with user assistance, such as confirmation of automatically generated and presented language identifiers. The exemplary embodiment supports the following use cases:

| User Query | Target Language for Search Results |
| --- | --- |
| One language | Same language as query |
| One language | One different language |
| One Language | Many different languages |
| One Language | Same language plus different languages |
| Multiple Languages | Same Languages as query |
| Multiple Languages | One different language |
| Multiple Languages | Many different languages |
| Multiple Languages | Same languages plus many different languages |

Execution then advances to block 240 (as shown in FIG. 2.)

Block 240 parses the query into one or more query terms, with each query term associated with a corresponding language identifier. In the exemplary embodiment, this entails parsing the query using conventional language-specific parsing techniques and eliminating language-specific stop words. The exemplary embodiment also entails stemming the words using language-specific stemmers to define stemmed versions of the query terms. Execution of the exemplary method continues at block 250.

Block 250 translates the original and stemmed versions of each query term into each of the target languages to define respective sets of one or more equivalent query terms; In the exemplary embodiment, translating the original and stemmed versions of each term includes identifying equivalent query terms using each of the following: a lexicon built from a database of pre-translated documents (that is, a parallel corpus), an electronic language dictionary, an automated translator, and a pivot language.

For lexicons built from parallel corpora, the exemplary embodiment considers a parallel corpus to be a body of documents where each document is represented in at least two languages A and B. Exemplary parallel corpora include legal documents in the European Union, which are commonly provided in at least German, French, and English. Patents are also sometimes translated into multiple languages and can also serve as parallel corpora. The parallel corpora can be used, in combination with an IBM statistical machine translation training phase and a similarity thesaurus, to generate a one-way lexicon of terms where a term has one to many weighted translations. That is each term a →(maps or translates to equivalent query terms) $b_1^w, b_2^w, b_3^w$. The electronic dictionary provides a one-way lexicon of terms where each term has one or more translations: for example, a →$b_1, b_2$. Automatic machine translation is used in the exemplary embodiment for natural language translation of a phrase or sentence from language A to B: for example. "$a_1\ a_2$"→$b_1$. A pivot language may be used to create the associations between two languages that have each established associations to the pivot language. If a term or concept in language A has an associated term or concept in language B, and if the same term or concept in language A has its associated term concept in language C, then the concept in language B has an associated concept in language C. In other words, if a→b and a→c, then b→c.

Thus, in the exemplary embodiment, each query term (concept or phrase) is associated with 2× sets of equivalent query terms, with X being the number of target languages. Moreover, each set of equivalent terms results from as many as four possible translation or equivalence-determination techniques. Integrating several translation methodologies or techniques is believed to result in more accurate and meaningful translations with fewer ambiguities. Execution continues at block 260.

Block 260 entails identifying one or more sets of documents from the document collection for each of the target languages, with each set identified based on the equivalent query terms for the corresponding target language. In the exemplary embodiment, this entails use of a Boolean or natural-language search engine to process each of the sets of equivalent query terms using a corresponding one of the language specific indices 114. Each of the equivalent monolingual queries is resolved by relying on the OR operator to provide hits for one or more of the language specific terms in a document. In some embodiments, other logical operators may be used to combine the various sets of equivalent monolingual query terms. For natural-language searching, identifying each set of documents includes determining a relevance score for documents based on the equivalent query terms, and then identifying documents having a relevance score exceeding a predetermined threshold.

Block 270 entails presenting a graphical user interface listing the identified set of documents in groups based on corresponding language and/or in rank order of relevance. In the exemplary embodiment, this entails displaying a listing of the identified set of documents on interface 138, specifically search-results region 1382. Whether the set is displayed in language groupings or in rank order of relevance (or other criteria such as date) is governed by user preference stored in subscriber database 123. Some embodiments include a command feature on the interface, enabling a user to selectively alter the display mode from the language-grouping mode to the relevance mode and vice versa. In some embodiments, the relevance mode results in normalization of the scores between documents of different language types. In addition, search concepts are weighted by language type.

CONCLUSION

In furtherance of the art, the present inventors have presented various embodiments of multilingual information-retrieval systems, methods, software, and interfaces. One exemplary system enables a user to submit a single monolingual or multilingual query and search one or more collections of monolingual or multilingual documents. Components of the system include multiple monolingual indices, a mechanism for translating a query into multiple sets of equivalent monolingual query terms, and a mechanism for effectively routing the respective sets of monolingual query terms to the appropriate monolingual indices for identification of relevant documents. Ultimately, the exemplary embodiment allows any combination of collections and languages to be searched with a single query and a single search platform.

The embodiments described above and in the claims are intended only to illustrate and teach one or more ways of practicing or implementing the present invention, not to restrict its breadth or scope. The actual scope of the invention, which embraces all ways of practicing or implementing the teachings of the invention, is defined only by the issued claims and their equivalents.

What is claimed is:

1. A method computer-implemented comprising:
    defining a set of one or more language-specific indices, in at least one data-storage device, for a collection of documents, with each index including stemmed and non-stemmed versions of terms contained in the documents;
    receiving a query from a user, with the query associated with a set of one or more target languages;
    parsing the query into one or more terms, using at least one processor, with each term associated with a corresponding language identifier and a stemmed version of the term;
    translating the original and stemmed versions of each term, using at least one processor, into each of the target languages, using at least one processor, to define respective sets of one or more equivalent query terms; and
    identifying a set of documents from the collection of documents for each of the target languages, with each set identified based on the equivalent query terms for the corresponding target language.

2. The method of claim 1, wherein each term in each index is associated with a document identifier for uniquely identifying one of the documents in the collection, a positional indicator for indicating a position of the term in the one of the documents, and a language indicator for indicating language of the term.

3. The method of claim 1, wherein before receiving the query from a user, the user defines the query by interacting with a graphical user interface having a query submission screen having a control region for entering terms of the query; a control region for selecting one or more of the target languages; and a control region for submitting the query.

4. The method of claim 1, wherein the query is associated with a set of one or more target languages selected by the user.

5. The method of claim 1, wherein translating the original and stemmed versions of each term into two or more equivalent query terms in one of the target languages, includes identifying equivalent query terms using at least two of the following: a database of pre-translated documents, an electronic language dictionary, an automated translator, and a pivot language.

6. The method of claim 1:
    wherein identifying the set of documents from the collection for each of the target languages, includes:
        determining a relevance score for documents based on the equivalent query terms; and
        identifying documents having a relevance score exceeding a predetermined threshold; and
    wherein the method further comprises presenting a graphical user interface listing the identified set of documents in groups based on corresponding language and/or in rank order of relevance.

7. A computer-implemented system comprising:
a collection of documents;
a set of one or more language-specific indices for the collection of documents, with each index including stemmed and non-stemmed versions of terms contained in the documents; and
a server for interacting with the collection of documents and the set of language-specific indices, with the server configured:
to receive a query from a user, with the query associated with a set of one or more target languages;
to parse the query into one or more terms, with each term associated with a corresponding language identifier and a stemmed version of the term;
to translate the original and stemmed versions of each term into each of the target languages and thus define respective sets of one or more equivalent query terms; and
to identify a set of documents from the collection of documents for each of the target languages, with each set identified based on the equivalent query terms for the corresponding target language.

8. The system of claim 7, wherein each term in each index is associated with a document identifier for uniquely identifying one of the documents in the collection, a positional indicator for indicating a position of the term in the one of the documents, and a language indicator for indicating language of the term.

9. The system of claim 7, wherein the server is further configured to define a graphical user interface for enabling a user to submit a query, the interface having a query submission screen having a control region for entering terms of the query; a control region for selecting one or more of the target language; and a control region for submitting the query.

10. The system of claim 7, wherein to translate the original and stemmed versions of each term into two or more equivalent query terms in one of the target languages, the server is further configured to identify equivalent query terms using at least two of the following: a database of pre-translated documents, an electronic language dictionary, an automated translator, and a pivot language.

11. The system of claim 7, wherein the server includes a processor and a memory, and the memory includes coded instructions for causing the processor: to receive the query from a user, to parse the query into one or more terms, to translate the original and stemmed versions of each term into each of the target languages and thus define respective sets of one or more equivalent query terms, and to identify a set of documents from the collection of documents for each of the target languages.

12. A server for interacting with a collection of documents and a set of language-specific indices, with the server configured:
to receive a query from a user, with the query associated with a set of one or more target languages;
to parse the query into one or more terms, using at least one processor, with each term associated with a corresponding language identifier and a stemmed version of the term;
to translate the original and stemmed versions of each term, using at least one processor, into each of the target languages and thus define respective sets of one or more equivalent query terms; and
to identify a set of documents from the collection of documents for each of the target languages, with each set identified based on the equivalent query terms for the corresponding target language.

13. The server of claim 12, wherein each term in each index is associated with a document identifier for uniquely identifying one of the documents in the collection, a positional indicator for indicating a position of the term in the one of the documents, and a language indicator for indicating language of the term.

14. The server of claim 12, wherein the server is further configured to define a graphical user interface for enabling a user to submit a query, the interface having a query submission screen having a control region for entering terms of the query; a control region for selecting one or more of the target language; and a control region for submitting the query.

15. The server of claim 12, wherein to translate the original and stemmed versions of each term into two or more equivalent query terms in one of the target languages, the server is further configured to identify equivalent query terms using at least two of the following: a database of pre-translated documents, an electronic language dictionary, an automated translator, and a pivot language.

16. The server of claim 12, wherein the server includes a processor and a memory, and the memory includes coded instructions for causing the processor: to receive the query from a user, to parse the query into one or more query terms, to translate original and stemmed versions of each query term into each of the target languages and thus define respective sets of one or more equivalent query terms, and to identify a set of documents from the collection of documents for each of the target languages.

17. A non-transitory machine-readable medium for causing a server to interact with a collection of documents and a set of language-specific indices, with the medium comprising instructions for causing the server:
to receive a query from a user, with the query associated with a set of one or more target languages;
to parse the query into one or more terms, with each term associated with a corresponding language identifier and a stemmed version of the term;
to translate the original and stemmed versions of each term into each of the target languages and thus define respective sets of one or more equivalent query terms; and
to identify a set of documents from the collection of documents for each of the target languages, with each set identified based on the equivalent query terms for the corresponding target language.

18. The non-transitory medium of claim 17, wherein each term in each index is associated with a document identifier for uniquely identifying one of the documents in the collection, a positional indicator for indicating a position of the term in the one of the documents, and a language indicator for indicating language of the term.

19. The non-transitory medium of claim 17, further including instructions to define a graphical user interface for enabling a user to submit a query, the interface having a query submission screen having a control region for entering terms of the query; a control region for selecting one or more of the target language; and a control region for submitting the query.

20. The non-transitory of claim 17, wherein the instructions for causing the server to translate the original and stemmed versions of each term into two or more equivalent query terms in one of the target languages, include instructions to identify equivalent query terms using at least two of the following: a database of pre-translated documents, an electronic language dictionary, an automated translator, and a pivot language.

21. A system comprising:
- a set of one or more language-specific indices for a collection of documents, with each index including stemmed and non-stemmed versions of terms contained in the documents;
- a computer comprising a processor and a non-transitory memory, the memory comprising instructions when executed by the processor configured to:
- receive a query from a client access device, with the query associated with a set of one or more target languages;
- parse the query into one or more original terms, with each term associated with a corresponding language identifier and a stemmed version of the term;
- translate the original and stemmed versions of each term into each of the target languages to define respective sets of one or more equivalent query terms; and
- identify a set of documents from a collection of documents for each of the target languages, with each set identified based on the equivalent query terms for the corresponding target language.

22. The system of claim 21, wherein each term in each index is associated with a document identifier for uniquely identifying one of the documents in the collection, a positional indicator for indicating a position of the term in the one of the documents, and a language indicator for indicating language of the term.

23. The system of claim 21, wherein the client access device includes a graphical user interface having a query submission screen having a control region for entering terms of the query; a control region for selecting one or more of the target languages; and a control region for submitting the query.

24. The system of claim 21, wherein the memory further comprises instructions when executed by the processor configured to: identify equivalent query terms using at least two of the following: a database of pre-translated documents, an electronic language dictionary, an automated translator, and a pivot language.

25. The system of claim 21:
- wherein the memory further comprises instructions when executed by the processor configured to:
- determine a relevance score for documents based on the equivalent query terms; and
- identify documents having a relevance score exceeding a predetermined threshold; and
- wherein the system comprises a display configured to present a graphical user interface listing the identified set of documents in groups based on corresponding language and/or in rank order of relevance.

* * * * *